US006905028B2

(12) United States Patent
Maples

(10) Patent No.: US 6,905,028 B2
(45) Date of Patent: Jun. 14, 2005

(54) METHOD OF SEPARATION BY ALTERING MOLECULAR STRUCTURES

(76) Inventor: Durham Russell Maples, 1507 Park Cir., Camden, SC (US) 29020

( * ) Notice: Subject to any disclaimer, the term of this patent is extended or adjusted under 35 U.S.C. 154(b) by 110 days.

(21) Appl. No.: 10/092,281

(22) Filed: Mar. 6, 2002

(65) Prior Publication Data

US 2003/0168384 A1 Sep. 11, 2003

(51) Int. Cl.$^7$ ................................................. B03D 3/00
(52) U.S. Cl. .................................. 209/4; 162/5; 162/9
(58) Field of Search ................................ 209/3, 4, 5, 7, 209/9, 166, 167; 516/100; 423/35; 162/4–8, 9, 55, 70, 72

(56) References Cited

U.S. PATENT DOCUMENTS

| | | | | |
|---|---|---|---|---|
| 3,912,706 A | * | 10/1975 | Rachor et al. | 527/403 |
| 3,951,786 A | * | 4/1976 | Petrovich | 209/166 |
| 3,960,724 A | * | 6/1976 | Barna | 556/173 |
| 4,066,505 A | * | 1/1978 | Schneider | 435/178 |
| 4,134,737 A | * | 1/1979 | Yang | 44/621 |
| 4,158,548 A | * | 6/1979 | Burk et al. | 44/624 |
| 4,297,108 A | * | 10/1981 | Horowitz et al. | 44/623 |
| 4,332,593 A | * | 6/1982 | Burgess et al. | 44/280 |
| 4,440,635 A | | 4/1984 | Reinger | |
| 4,632,750 A | * | 12/1986 | McGarry | 209/166 |
| 4,724,072 A | * | 2/1988 | Bornengo et al. | 209/167 |
| 4,761,203 A | * | 8/1988 | Vinson | 162/9 |
| 4,836,914 A | | 6/1989 | Inoue | |
| 4,851,037 A | * | 7/1989 | Bornengo et al. | 209/166 |
| 4,880,529 A | * | 11/1989 | Bulatovic et al. | 209/167 |
| 4,886,522 A | * | 12/1989 | Davidson et al. | 44/624 |
| 5,290,401 A | | 3/1994 | Savisalo | |
| 5,358,119 A | | 10/1994 | Stahl | |
| 5,653,867 A | | 8/1997 | Jody | |
| 6,017,475 A | * | 1/2000 | Cantrell | 264/140 |
| 6,140,040 A | * | 10/2000 | Palm et al. | 435/2 |
| 6,270,679 B1 | | 8/2001 | Kreisler | |
| 6,375,853 B1 | * | 4/2002 | Yoon | 210/727 |
| 2003/0010680 A1 | * | 1/2003 | Holmes et al. | 209/172.5 |

OTHER PUBLICATIONS

Isaak and Henry Zimmerman; Elements of Organic Chemistry 1977; pp. 137,190–192,264,268–274 and 331–333; 2$^{nd}$ Edition.

Macmillan Publishing Co., Inc. 866 Third Avenue, New York, New York 10022.

* cited by examiner

Primary Examiner—Donald P. Walsh
Assistant Examiner—Joseph C Rodriguez

(57) ABSTRACT

Method of separation that uses at least one organic chemical reaction to alter the molecular structure of a substance or substances (102) so that a mechanical method of separation can be used to cause the separation of one or more substances from one or a group of substances (104). The organic chemical reaction alters the molecular structure by adding at least one atom to the molecular structure or by subtracting at least one atom from the molecular structure. The mechanical method of separation uses the differing physical characteristics of substances to physically change the place or position of substances to remove or isolate the substances from a combination or a mixture absent any chemical reaction. The organic chemical reaction and the mechanical method of separation are used in combination to cause the separation of substances that otherwise could not be separated by the mechanical method of separation alone.

21 Claims, 4 Drawing Sheets

METHOD OF SEPARATION BY ALTERING MOLECULAR STRUCTURES

REFERENCES CITED

U.S. Patent Documents:

U.S. Pat. No. 6,270,679 Jul. 7, 2001 Kreisler
U.S. Pat. No. 5,358,119 Oct. 25, 1994 Stahl, et al.
U.S. Pat. No. 4,440,635 Apr. 3, 1984 Reinger
U.S. Pat. No. 5,290,401 Mar. 1, 1994 Savisalo, et al.
U.S. Pat. No. 4,836,914 Jun. 6, 1989 Inoue, et al.
U.S. Pat. No. 5,653,867 Jul. 5, 1997 Jody, et al.
Other Publications
*Elements of Organic Chemistry*, Isaak and Henry Zimmerman Macmillan Publishing Co., Inc. 866 Third Avenue, New York, N.Y. 10022—pages 137, 190–192, 264, 268–274 and 331–333.

BACKGROUND

1. Field of Invention

This invention relates to the field of chemical engineering, specifically to a method of separation through chemical engineering.

2. Background—Discussion of Prior Art

Separation of one substance from another substance has long been a desired goal of industry. Since the advent of industry, commonly used means of separating one substance from another substance or other substances have been mechanical in nature. These mechanical methods of separation are screens, semi-permeable membrane, specific gravity flotation, electrostatic techniques and magnetic attraction. The difficulty with these methods of separation is that they require one of the substances have a differential that will distinguish that substance from all of the others. There must be a difference in states of matter with screen separation. There must be a difference in molecular size with membrane separation. There must be a noticeable difference in specific gravity (density) of a substance if flotation separation is to be successful. There must be an electrostatic value difference with one substance if electrostatic techniques are to be used in separating the substances. To separate by magnetic attraction, one substance must contain the element Iron, Cobalt or Nickel and the amount must be noticeably different from the other substances.

These various mechanical means of separation are not very efficient or even successful for all substances that an industry may wish to separate. Mechanical methods of separation are dependent on the inherent physical characteristics of the substances that are to be separated. These mechanical methods of separation have no method of changing the physical characteristics or creating new physical characteristics of the substances that need to be separated. An important step in making these mechanical methods of separation more efficient, or even possible in some cases, would be to have a method to change the physical characteristics of the substance to allow the mechanical methods to operate more efficiently or operate at all.

Patent documents refer to some of these mechanical methods of separation. U.S. Pat. No. 4,836,914 Inoue et al.—Method for removing iron content in petroleum series mineral therefrom is an example. This method does not include a way to remove a substance that does not have a magnetic attraction as an inherent physical characteristic. This invention is restricted to removing a substance that already has a magnetic attraction by using magnetic separation. This invention does not create a substance that will have a magnetic attraction so that a method of magnetic separation can be used. This invention does not increase or decrease the magnetic attraction of a substance so that a method of magnetic separation can be used.

U.S. Pat. No. 5,290,401 Savisalo et al.—Method and a device for separating plastic particles from suspensions. This invention is restricted to separating plastic particles from suspensions using turbulent flows and concentration differences. A screening device aids in the separation.

This invention does not include a method to create or change the concentration difference of one substance in order to separate that substance from others.

U.S. Pat. No. 4,440,635 Reinger—Process and apparatus for the recovery of cellulose fibers from paper-plastic mixtures. This invention is restricted to recovering cellulose fibers from paper-plastic mixtures by controlled wetting to increase the weight of the sheet of paper relative to the plastic and then use abrasive forces to fiberize the paper for separation through screening. This invention does not create or change the specific gravity of one substance in order to separate that substance from others.

Organic chemistry books are filled with organic chemical reactions that are available to a chemical engineer that can be used to form a new substance. Using an organic chemical reaction to alter a substance to form another substance is called an organic synthesis. Chemical engineers do this to create new substances that will be used for industrial applications. Organic chemistry textbooks such as *Elements of Organic Chemistry* present these reactions for no other purpose than to show how the specific reactions operate for educational purposes. Pages 191–192 discuss how an organic chemical reaction alters an alcohol to form either a carboxylic acid or a ketone. This organic chemical reaction alters the molecular structure of a substance. Other organic chemical reactions discussed in the book also demonstrate how to alter the molecular structure of a substance to form a new substance. The purpose for creating the new substance is to somehow use the new substance for some useful purpose. The purpose for creating the new substance is never to prepare the substance for separation by a mechanical method of separation. There is not a method or process that uses organic chemical reactions or organic synthesis to alter the molecular structure of a substance so that a mechanical method of separation can be used to successfully separate one substance from other substances.

U.S. Pat. No. 5,358,119 Stahl et al.—Method of separating a mixture of plastics comprising at least three components using electrostatic techniques. This invention uses heat and/or a chemical substrate to enhance the triboelectric charge of a plastic but this is not done with a chemical reaction. The chemical treatment referred to is the selection of a substrate or "the separation liquid is selected". This invention does not use a chemical reaction to alter the molecular structure of any substance.

U.S. Pat. No. 6,270,679 Kreisler—Method for recovering and separating metals from waste streams. The chemical agents in this invention are employed to promote binding of metals together but does not alter the molecular structure of the metals. Oxidizing agents and reducing agents are used to degrade or decompose organic compounds and chelating agents, respectively. This invention would only separate metals and would not do so by altering the molecular structure. Degrading or decomposing a substance is not separating that substance from another. Organic compounds are destroyed and cannot be separated with this invention. The binding of the metals is done by promoting the ionic bonding among all the metals in the waste stream and this does not alter the molecular structure of the metals. Altering the molecular structure of a substance means that at least one atom is either removed or added to the molecule. There is not a method or process that uses organic chemical reaction or organic synthesis to alter the molecular structure of a substance so that a mechanical method of separation can be used to successfully separate one substance from other substances. U.S. Pat. No. 5,653,867 Jody, et al.—Method for the separation of high impact polystyrene(HIPS) and acrylonitrile butadiene styrene(ABS) plastics. This invention is restricted to separating 2 substances that have a specific gravity greater than but near 1.0. There must be a specific surface tension range and certain pH range. The invention treats the surface of the HIPS plastic with an acid and water solution to cause air bubbles to adhere more to the surface of HIPS plastics than to ABS. These air bubbles act as "buoys" that float the HIPS plastics to the top of the water on specific gravity flotation and the ABS remains on the bottom. The invention does not use an organic chemical reaction to alter the molecular structure of HIPS or ABS. The air bubbles adhering to the surface of a substance do not alter the molecular structure of that substance.

OBJECTS AND ADVANTAGES

Accordingly, several objects and advantages of my invention are:

A) The ability to chemically create a molecular characteristic that will differentiate the substance from other substances for the purpose of separating the substance from the other substances.
B) The ability to chemically enhance or dampen a molecular characteristic that will differentiate the substance from other substances for the purpose of separating the substance from the other substances.
C) A variety of different mechanical methods of separation can be used to separate any substance. An organic chemical reaction or a series of chemical reactions can be chosen to chemically alter the molecular structure to allow any one of the mechanical methods of separation to be used. Specific gravity or density flotation, screening, magnetic separation, electrostatic techniques, separation, semi-permeable membrane, etc. . . . can be used depending on the requirements of the specific industry.
D) The ability to separate both a contaminant-product mixture or a product-product mixture. There is an organic chemical reaction that alters the molecular structure of the product and then a mechanical separation is accomplished. Another organic chemical reaction can be employed to change or regenerate the molecular structure back to the original state prior to mechanical separation.
E) The ability to separate a substance but not degrade, decompose and/or destroy the substance. This way a product-product mixture can be separated and both products are candidates for recycling.
F) The ability to separate a substance by a mechanical method that was not previously possible by chemically altering the molecular substance so that the mechanical method of separation is then possible.
G) The ability to vary the organic chemical reactions and the mechanical methods of separation.
H) The invention is not restricted to separating just organic substances or just inorganic (metal) substances.
I) The invention is the only current way to separate cellulose from low density plastic successfully.
J) The invention has a great deal of variation due to the number of mechanical methods of separation available to select from and numerous organic chemical reactions available from which to select.
K) The variations of the invention can continue to expand as other mechanical methods are invented, as other organic chemical reactions are discovered and other organic chemical reagents are created.
L) Known organic chemical reactions can be postponed or interrupted in mid reaction to employ a mechanical method of separation.

LIST OF REFERENCE NUMERALS

Figure 1:
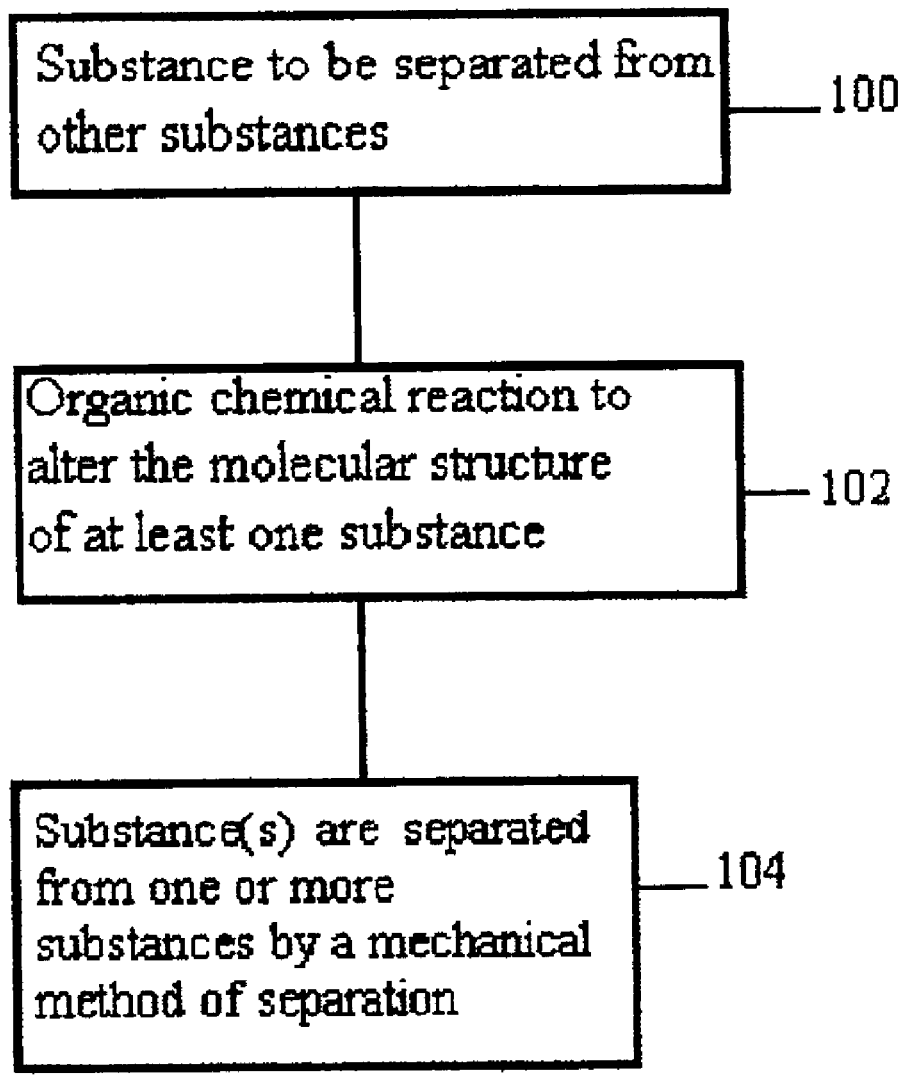
FIG. 1 shows a general overview of the invention that includes the major steps required in the method of separation.

100 Substance to be separated from other substances
102 Organic chemical reaction to alter the molecular structure of at least one substance
104 The substance(s) is separated from one or more substances by a mechanical method of separation
200 Cellulose(paper) to be separated from low density plastics
202 Friedel-Craft alkylation reaction with a high density carbon chain alters the molecular structure and the specific gravity of plastics with a Benzene ring
204 Altered Benzene ring plastics sink in added water on specific gravity flotation
206 Altered Benzene ring plastics are separated from cellulose-plastic mixture by a specific gravity separation device
208 The cellulose-plastic mixture is treated with a high density Ketone that is catalyzed with an acid that bonds the high density Ketone to the cellulose
210 Altered high density cellulose sinks in added water on specific gravity flotation
212 Altered high density cellulose is separated from the plastic mixture by a specific gravity separation device
214 Water is drained from the altered high density cellulose. Adding an acid catalyst removes the high density Ketone and reconstructs the cellulose to the original molecular structure
300 A high density Ketone is added to the cellulose-plastic mixture and is catalyzed with an acid to bond the high density Ketone to the cellulose and to the Alcohol plastics
302 Altered high density cellulose and altered high density Alcohol plastics sink in added water on specific gravity flotation
304 Altered high density cellulose and altered high density Alcohol plastics are separated from low density plastics by a specific gravity separation device
306 Altered high density cellulose sinks faster on specific gravity flotation and is separated from altered high density Alcohol plastics by timing the different rates of descent, then skimming off the slower altered high density Alcohol plastics leaving the altered high density cellulose

SUMMARY OF INVENTION

The invention requires that at least one organic chemical reaction be used to alter the molecular structure of a substance so that a mechanical method or means of separation can be used to cause the separation of one substance from another substance or many substances. A mechanical method of separation is a method of separation that uses differing physical characteristics of substances to physically change the place or the position of substances that removes or isolates them from a combination or a mixture absent any chemical reaction. The organic chemical reaction alters the molecular structure by adding at least one atom to the molecule of a substance or subtracting at least one atom from the molecule of a substance. The organic chemical reaction causes a molecular alteration and a physical characteristic alteration of the substance that allows a mechanical means of separation to be used that would have been too inefficient or otherwise impossible to use.

DESCRIPTION OF INVENTION

FIG. 1 shows a general overview of the invention. A substance to be separated from other substances 100. An organic chemical reaction to alter the molecular structure of a substance 102 is used to prepare the substance for separation. Then the substance(s) is separated from one or more substances by a mechanical method of separation 104.

Figure 2:
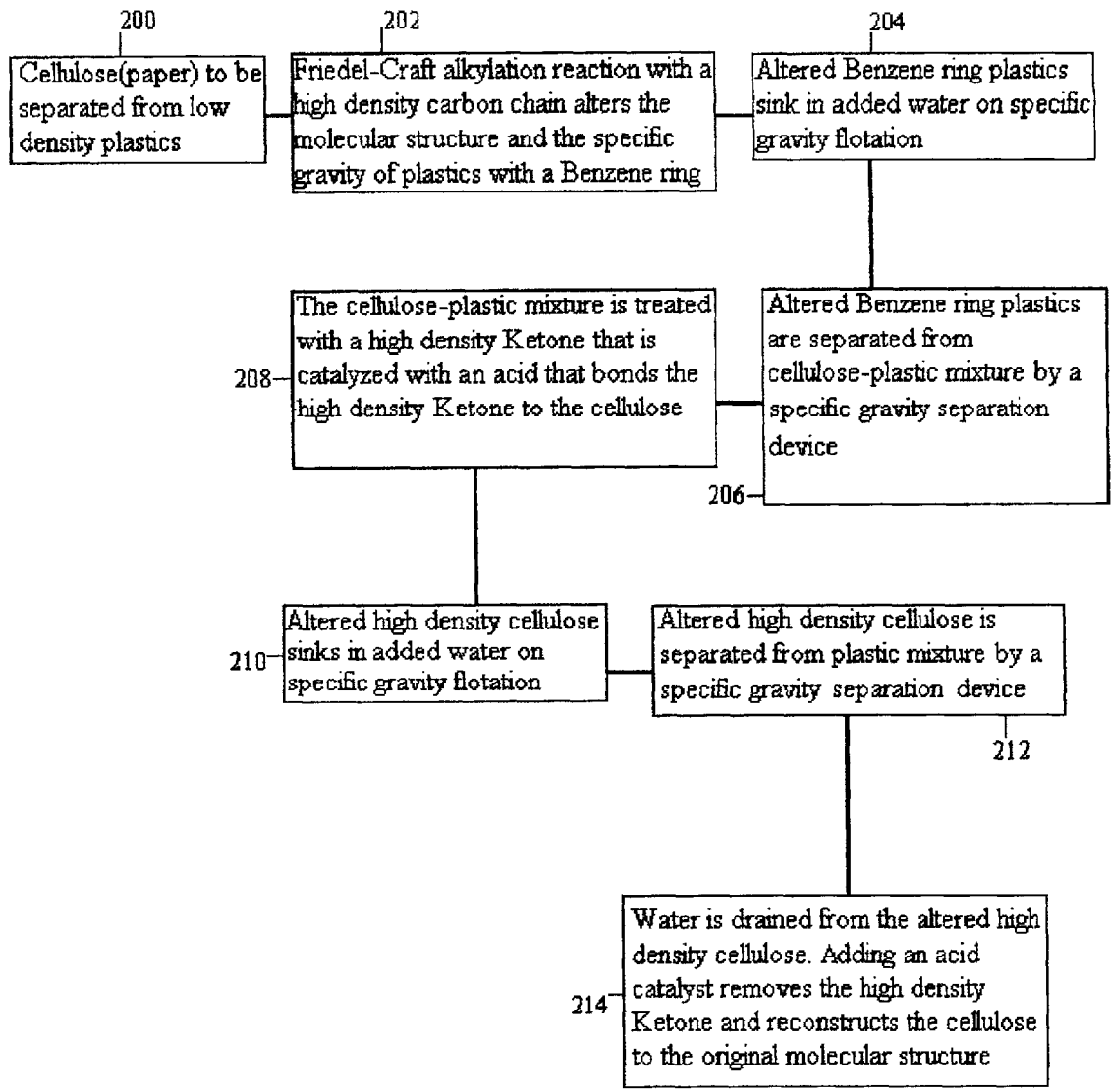
FIG. 2 shows an embodiment of the invention that includes a method for separation of cellulose from low density plastics.

FIG. 2 shows a specific example of the invention. Cellulose (paper) to be separated from low density plastics 200. The Friedel-Craft alkylation reaction with a high density carbon chain alters the molecular structure and the specific gravity of plastics with a Benzene ring 202. Altered Benzene ring plastics sink in added water on specific gravity flotation 204. The altered Benzene ring plastics are separated from cellulose-plastic mixture by a specific gravity separation device 206. The cellulose-plastic mixture is treated with a high density Ketone that is catalyzed with an acid that bonds the high density Ketone to the cellulose 208. The altered high density cellulose sinks in added water on specific gravity flotation 210. Altered high density cellulose is separated from plastic mixture by a specific gravity separation device 212. Water is drained from the altered high density cellulose. Adding an acid catalyst removes the high density Ketone and reconstructs the cellulose to the original molecular structure 214.

Figure 3:
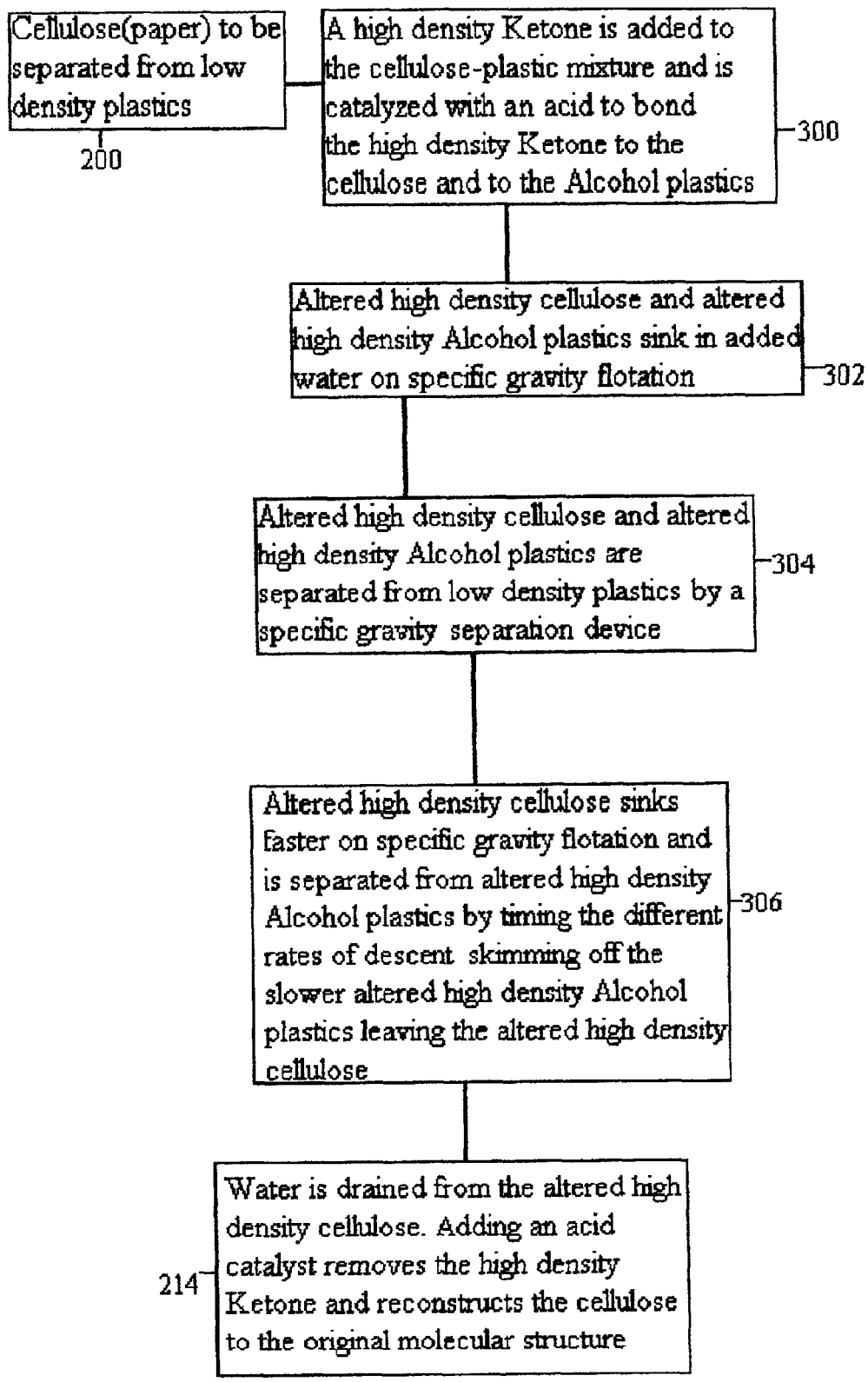
FIG. 3 shows an embodiment of the invention that includes a method for separation of cellulose from low density plastics by timing the different rates of descent of the altered cellulose and some altered plastics.

FIG. 3 shows a specific example of the invention that modifies the specific gravity flotation and requires only 2 organic chemical reactions. Cellulose(paper) to be separated from low density plastics 200. A high density Ketone is added to the cellulose-plastic mixture and is catalyzed with an acid to bond the high density Ketone to the cellulose and to the Alcohol plastics 300. Altered high density cellulose and altered high density Alcohol plastics sink in added water on specific gravity flotation 302. Altered high density cellulose and altered high density Alcohol plastics are separated from low density plastics by a specific gravity separation device 304. Altered high density cellulose sinks faster on specific gravity flotation and is separated from the altered high density Alcohol plastics by timing the different rates of descent skimming off the slower altered high density Alcohol plastics leaving the altered high density cellulose 306. Water is drained from the altered high density cellulose. Adding an acid catalyst removes the high density Ketone and reconstructs the cellulose to the original molecular structure 214.

The paper making industry would probably not use the exact steps shown in FIG. 2 or FIG. 3. The paper making industry does not use a specific gravity separation tank because they work with flow which requires a hydrocyclone device. This device is a specific gravity separator that uses a great centrifugal force to throw the high density(greater than 1.0 specific gravity) material to the sides and leaves the low density(less than 1.0 specific gravity) material in the center. This device is not as effective as a separation tank when a rate of descent timing is needed. The part of the paper making industry that uses virgin wood and no recycled pulp will use the example shown in FIG. 4. Cellulose (paper) to be separated from low density plastics 200. The cellulose-plastic mixture is treated with a high density Ketone that is catalyzed with an acid that bonds the high density Ketone to the cellulose 208. Altered high density cellulose sinks in added water on specific gravity flotation 210. Altered high density cellulose is separated from plastic mixture by a specific gravity separation device 212. Water is drained from the altered high density cellulose. Adding an acid catalyst removes the high density Ketone and reconstructs the cellulose to the original molecular structure 214.

Figure 4:
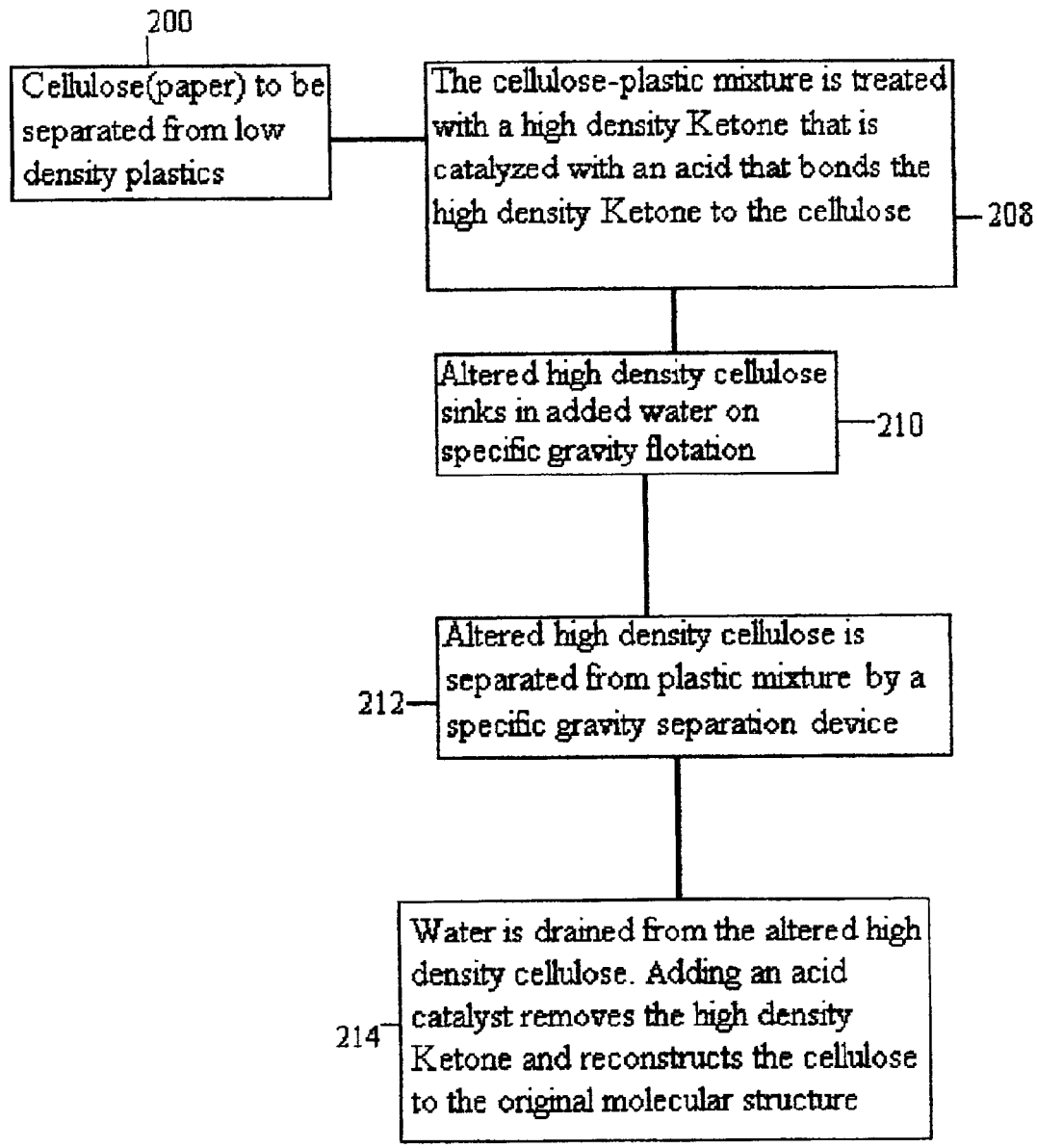
FIG. 4 shows an embodiment of the invention that has the least number of steps for a method of separation of cellulose from low density plastics.

The steps shown in FIG. 4 are specifically designed for any cellulose separation that does not have Alcohol plastic contaminants such as epoxy resin in the mixture. Paper made from virgin wood should have no need to remove any Alcohol plastics or any Benzene ring plastics of which epoxy resins are included in both groups. Epoxy resins could pose a problem when recycled paper is used to make paper. Epoxy resin is sometimes used in laminated paper but epoxy resin is a thermoset that cannot be recycled so either FIG. 2 or FIG. 3 can be used to separate cellulose if epoxy resins are present.

All paper-making, either virgin or recycled, will use a specific gravity separation device to separate low density materials (cellulose) from high density materials. The invention then can be used as shown in FIG. 2, FIG. 3 and FIG. 4 to alter the molecular structure of a substance (particularly cellulose) by using an organic chemical reaction. The specific gravity is altered so that low density materials can be separated from other low density materials using the economical specific gravity method. Cellulose transformed temporarily into a high density substance can be separated from the low density materials. Another organic chemical reaction reconstructs the cellulose back into the original structure. A high density Aldehyde can be used in place of the high density Ketone.

A secondary ramification of this method is that altering the molecular structure of cellulose by bonding a molecule or molecules temporarily to the glucose molecules in the cellulose this way can remove a portion of the lignin from the cellulose, in the virgin wood paper making process. This can lead to a "brighter" paper product on bleaching or could remove the need to use a strong oxidizing agent in the bleaching process of virgin pulpwood. If a strong oxidizing agent such as chlorine dioxide is not used acid groups will not be formed on the cellulose and there will be no need to remove these acid groups later in the process. The acid groups cause the paper formed to be acid paper and this paper breaks down faster than alkaline paper does. The part of the method which removes the temporarily bound molecules from the cellulose reconstructs the cellulose to it's original molecular state which is an alkaline state. The method could allow the virgin pulpwood paper makers to use a mild oxidizing agent for bleaching or even remove the need for any oxidizing agent which would mean not having to deal with acid groups on the cellulose ever again.

Separating low density plastics from other low density plastics or high density plastics from other high density plastics can use the same principles. Low density Ketones can be separated from other low density plastics by adding a high density Alcohol with an acid catalyst. This bonds the high density Alcohol to the low density Ketone creating a high density Hemiketal. The new high density Hemiketal is separated by a specific gravity separation device. Water is drained from the high density Hemiketal, adding an acid catalyst removing the high density Alcohol and reconstructing the low density Ketone. These same steps can be used with high density Ketones by adding a super high density Alcohol that is catalyzed with an acid that bonds the super high density Alcohol to the high density Ketones. This forms a super high density Hemiketal that sinks rapidly in separation tank. These super high density Hemiketals will sink much faster than poly(vinyl-chloride) PVC. Polyethylene terephthalate (PET) is a Ketone that can be separated from PVC in this manner. PET is the most marketable form of plastic bottle recycling and PVC interferes with PET separation because their specific gravity is nearly identical. PVC is a contaminant and unless it is removed from PET will make it impossible to recycle PET. One bottle of PVC can contaminate an entire ton of PET.

To be able to recycle any substance, the ability to separate it from other substances is essential. The major deterrent to all recycling today both paper and particularly plastic is the difficulty with separation. It is currently too difficult or impossible to separate a lot of the recyclable materials. The separation problem must be solved so that recycling at a high level is both possible and economical. Otherwise, recycling will stagnate or recede from the current levels and the cost to the environment is too great to allow this trend to continue.

The recycling industry must currently separate out the plastic by hand when plastic is mixed in with paper. Evidence is clear that paper and plastic separation is inefficient. The paper making industry does not allow employees to bring plastic on the mill sites because there is no effective method of separating paper from low density plastic. The invention provides an economical solution to separating the cellulose (paper) from the plastic contaminants or plastics to be recycled.

The new invention is flexible and can be used to separate a product-product mixture of plastic-paper for recycling or plastic-plastic mixture for recycling. Recycling requires that any of the plastics altered will have to be regenerated or reconstructed. The invention can do this by selecting different reactions or changing the order of the reactions used in the plastic-cellulose separation for the paper making industry. Specific gravity is the preferred method of separation because it is economical and no other method offers any greater effectiveness, but other mechanical methods of separation can be used such as magnetic attraction. Magnetic separation can work only if the substance has a iron, cobalt or nickel content. If an organic compound does not contain one of these metals then magnetic separation is useless. The previous examples have demonstrated how another organic compound can be bonded to a substance using an organic chemical reaction to alter the molecular structure. The organic compound can be an organometallic compound which is an organic compound that contains a metal. The metal can be either iron, cobalt or nickel and the new organometallic compound formed will have a magnetic attraction that will allow magnetic separation of the organometallic compound. At that time the reconstructing of the molecule can take place.

The invention is versatile in that it can use innumerable organic reactions and multiples of these reactions to alter the molecular structure of a substance. The invention can use a number of mechanical methods of separation and multiples of these methods to accomplish the goal of separating a substance from others. The organic chemical reactions and mechanical methods can be mixed and matched to suit the separation. The invention can add or subtract organic chemical reactions to get the desired result. The invention can add or subtract mechanical methods to get the desired result. The requirements are that at least one organic chemical reaction be used to alter the molecular structure of at least one substance. At least one mechanical method is used to separate the molecularly altered substance from the other substance.

The ramifications of the invention are that there is now an economical method to separate cellulose from low density plastics. There is a method to separate some low density plastics from other low density plastics, and a method to separate some high density plastics from other high density plastics. There is greater capability to separate all substances from other substances despite what similar physical characteristics they may all possess in the beginning.

While my above description contains many specifications, these should not be construed as limitations on the scope of the invention, but rather as an exemplification of some of the preferred and known embodiments of the invention. Many other variations are possible, such as using an organic chemical reaction with an acid catalyst to bond a large polymer macromolecule to a small alcohol. The newly formed macromolecule is created so that it cannot pass through a semi-permeable membrane while smaller molecules can pass through the semi-permeable membrane. Once separation is complete, the acid catalyst is added and the polymer macromolecule is removed thus reconstructing the small alcohol. All the variations of this invention are innumerable and yet unknown. Accordingly, the scope of the invention should be determined not by the embodiment(s) illustrated, but by the appended claims and their legal equivalents.

What is claimed is:

1. A method of separating a substance from a non-atomically bonded combination or mixture of substances, comprising;

utilizing at least one organic chemical reaction to alter the molecular structure and alter at least one physical characteristic of a substance other than a polypeptide or an enzyme by adding at least one atom to the molecular structure of said substance other than a polypeptide or an enzyme, or by removing, without dissolving or digesting, at least one atom from the molecular structure of said substance other than a polypeptide or an enzyme, utilizing a mechanical means of separation, other than froth flotation, that uses at least one differing physical characteristic of matter to physically change the place or position of matter that removes or isolates the matter from said non-atomically bonded combination or mixture of substances, impacting said non-atomically bonded combination or mixture of substances that contains said substance other than a polypeptide or an enzyme with said at least one organic chemical reaction to alter the molecular structure and alter at least one physical characteristic of said substance other than a polypeptide or an enzyme by adding at least one atom to the molecular structure of said substance other than a polypeptide or an enzyme, or by removing, without dissolving or digesting, at least one atom from the molecular structure of said substance other than a polypeptide or an enzyme, reacting said at least one organic chemical reaction that alters the molecular structure and alters at least one physical characteristic of said substance other than a polypeptide or an enzyme, by adding at least one atom to the molecular structure of said substance other than a polypeptide or an enzyme, or by removing, without dissolving or digesting, at least one atom from the molecular structure of said substance other than a polypeptide or an enzyme with said non-atomically bonded combination or mixture of substances that contains said substance other than a polypeptide or an enzyme which does alter the molecular structure and does alter a physical characteristic of said substance other than a polypeptide or an enzyme that is in said non-atomically bonded combination or mixture of substances, and separating said substance other than a polypeptide or an enzyme with altered molecular structure and altered at least one physical characteristic from said non-atomically bonded combination or mixture of substances by utilizing said mechanical means of separation that uses at least one differing physical characteristic of matter to physically change the place or position of matter that removes or isolates the matter from said non-atomically bonded combination or mixture.

2. The method of claim 1 comprising, using another one or more organic chemical reactions to reconstruct the altered molecular structure and the altered at least one physical characteristic of said substance other than a polypeptide or an enzyme to the original molecular structure and to the original state of the at least one physical characteristic of said substance other than a polypeptide or an enzyme that existed prior to the separation by said mechanical means of separation.

3. The method of claim 1 comprising, using a mechanical means of separation prior to reacting said at least one chemical reaction that alters the molecular structure and alters at least one physical characteristic of said substance other than a polypeptide or an enzyme, by adding at least one atom to the molecular structure of said substance other than a polypeptide or an enzyme, or by removing, without dissolving or digesting, at least one atom from the molecular structure of said substance other than a polypeptide or an enzyme with said non-atomically bonded combination or mixture of substances which does alter the molecular structure and does alter a physical characteristic of said substance other than a polypeptide or an enzyme that is in said non-atomically bonded combination or mixture of substances.

4. The method of claim 1 comprising, using a organic chemical reaction to alter the molecular structure of matter and to alter the specific gravity of matter in said non-atomically bonded combination or mixture of substances by removing at least one atom from the molecular structure of the matter.

5. The method of claim 1 comprising, using specific gravity flotation as the mechanical means of separation that utilizes at least two different liquids each having a different specific gravity.

6. The method of claim 1 comprising, using magnetic attraction as the mechanical means of separation.

7. A method of separating a substance from a non-atomically bonded combination or mixture of substances, comprising;

utilizing at least one organic chemical reaction to alter the molecular structure and alter at least one physical characteristic of said substance by removing, without dissolving or digesting, at least one atom from the molecular structure of said substance, utilizing a mechanical means of separation, other than froth flotation, that uses at least one differing physical characteristic of matter to physically change the place or position of matter that removes or isolates the matter from said non-atomically bonded combination or mixture of substances absent a chemical reaction, impacting said non-atomically bonded combination or mixture of substances that contains said substance with said at least one organic chemical reaction to alter the molecular structure and alter at least one physical characteristic of said substance by removing, without dissolving or digesting, at least one atom from the molecular structure of said substance, reacting said at least one organic chemical reaction that alters the molecular structure and at least one physical characteristic of said substance by removing, without dissolving or digesting, at least one atom from the molecular structure of said substance with said non-atomically bonded combination or mixture of substances that contains said substance which does alter the molecular structure of said substance and does alter a physical characteristic of said substance that is in said non-atomically bonded combination or mixture of substances, and separating said substance with altered molecular structure and altered at least one physical characteristic from said non-atomically bonded combination or mixture of substances by utilizing said mechanical means of separation, other than froth flotation, that uses at least one differing physical characteristic of matter to physically change the place or position of matter that removes or isolates the matter from said non-atomically bonded combination or mixture absent a chemical reaction.

8. The method of claim 7 comprising, using another one or more organic chemical reactions to reconstruct the altered molecular structure and the altered at least one physical characteristic of said substance to the original molecular structure and to the original state of the at least one physical characteristic of said substance that existed prior to the separation by said mechanical means of separation.

9. The method of claim 7 comprising, using a mechanical means of separation prior to reacting said at least one organic chemical reaction that alters the molecular structure and at least one physical characteristic of said substance by removing, without dissolving or digesting, at least one atom from the molecular structure of said substance with said non-atomically bonded combination or mixture of substances which does alter the molecular structure and does alter a physical characteristic of said substance that is in said non-atomically bonded combination or mixture of substances.

10. The method of claim 7 comprising, using a organic chemical reaction to alter the molecular structure of matter and to alter the specific gravity of matter in said non-atomically bonded combination or mixture of substances by removing, without dissolving or digesting, at least one atom from the molecular structure of the matter.

11. The method of claim 7 comprising, using specific gravity flotation as the mechanical means of separation that utilizes at least two different liquids each having a different specific gravity.

12. The method of claim 7 comprising, using magnetic attraction as the mechanical means of separation.

13. A method of separating cellulose from a non-aqueous non-atomically bonded combination or mixture of substances, comprising;

utilizing at least one organic chemical reaction to alter the molecular structure of cellulose and alter at least one physical characteristic of cellulose by adding at least one atom to the molecular structure of cellulose, utilizing a mechanical means of separation that uses at least one differing physical characteristic of matter to physically change the place or position of matter that removes or isolates the matter from a non-atomically bonded combination or mixture of substances, impacting said non-aqueous non-atomically bonded combination or mixture of substances that contains cellulose with said at least one organic chemical reaction to alter the molecular structure and alter at least one physical characteristic of the cellulose by adding at least one atom to the molecular structure of the cellulose, reacting the cellulose contained in said non-aqueous non-atomically bonded combination or mixture of substances with said at least one organic chemical reaction to alter the molecular structure and alter at least one physical characteristic of the cellulose that does alter the molecular structure and does alter at least one physical characteristic of the cellulose by adding at least one atom to the molecular structure of the cellulose, and separating the cellulose with the altered molecular structure and the altered at least one physical characteristic from said non-aqueous non-atomically bonded combination or mixture of substances by using said mechanical means of separation that uses the altered at least one physical characteristic of the cellulose to physically change the place or position of the altered cellulose that removes or isolates the altered cellulose from said non-aqueous non-atomically bonded combination or mixture of substances.

14. The method of claim 13 comprising, using another one or more organic chemical reactions to reconstruct the cellulose with the altered molecular structure and the altered at least one physical characteristic to the original molecular structure of the cellulose and to the original state of the at least one physical characteristic of the cellulose that existed prior to the separation by said mechanical means of separation.

15. The method of claim 13 comprising, using a mechanical means of separation prior to reacting the cellulose contained in said non-aqueous non-atomically bonded combination or mixture of substances with said at least one organic chemical reaction to alter the molecular structure of the cellulose and alter at least one physical characteristic of the cellulose that does alter the molecular structure and does alter at least one physical characteristic of the cellulose by adding at least one atom to the molecular structure of the cellulose.

16. The method of claim 13 comprising, using a organic chemical reaction to alter the molecular structure of the cellulose and to alter the specific gravity of the cellulose in said non-aqueous non-atomically bonded combination or mixture of substances by adding at least one atom from the molecular structure of the matter.

17. The method of claim 13 comprising, using specific gravity flotation as the mechanical means of separation that utilizes at least two different liquids each having a different specific gravity.

18. The method of claim 13 comprising, using magnetic attraction as the mechanical means of separation.

19. The method of claim 13 comprising, using said at least one organic chemical reaction to alter the molecular structure and to alter at least one physical characteristic of cellulose by adding a ketone compound or an aldehyde compound to the molecular structure of cellulose.

20. The method of claim 13 comprising, reacting cellulose that has carboxylic acid groups on the cellulose molecule from a previous oxidation reaction with an alcohol compound that bonds to the carboxylic acid groups on the cellulose molecule.

21. The method of claim 13 comprising, using at least one organic chemical reaction to alter the molecule structure of cellulose and remove lignin from the intermolecular bond with cellulose without forming a carboxylic acid group or a ketone group on the cellulose.

* * * * *